Sept. 23, 1941.  A. H. COHEN  2,256,517
CAMERA
Filed July 1, 1939  6 Sheets-Sheet 1
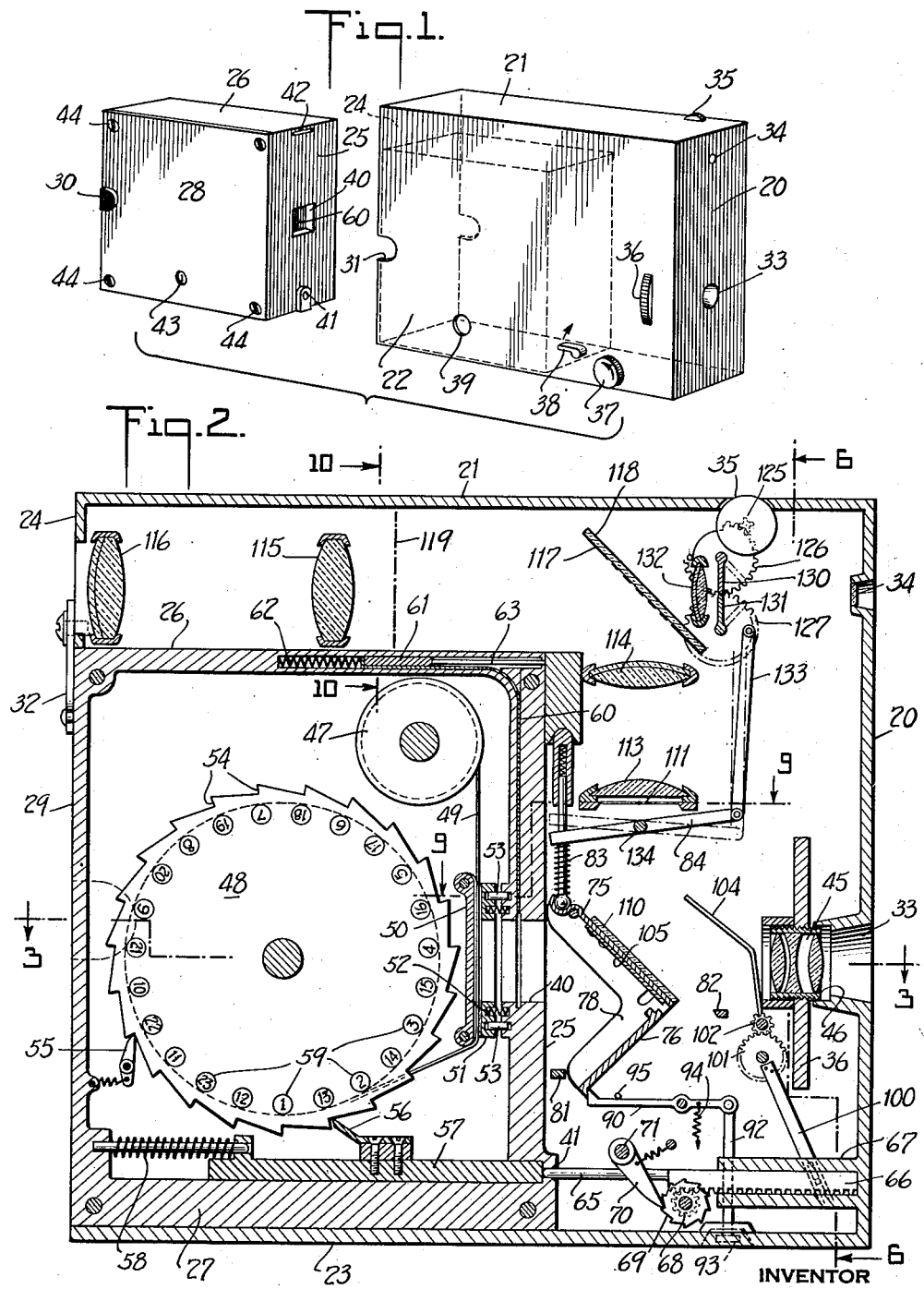
INVENTOR
Alvin H. Cohen
BY
Gluck + Greitenfeld
ATTORNEYS Sept. 23, 1941.  A. H. COHEN  2,256,517
CAMERA
Filed July 1, 1939  6 Sheets-Sheet 2

INVENTOR
Alvin H. Cohen
BY
Gluck & Breitenfeld
ATTORNEYS

Sept. 23, 1941.   A. H. COHEN   2,256,517
CAMERA
Filed July 1, 1939   6 Sheets—Sheet 3
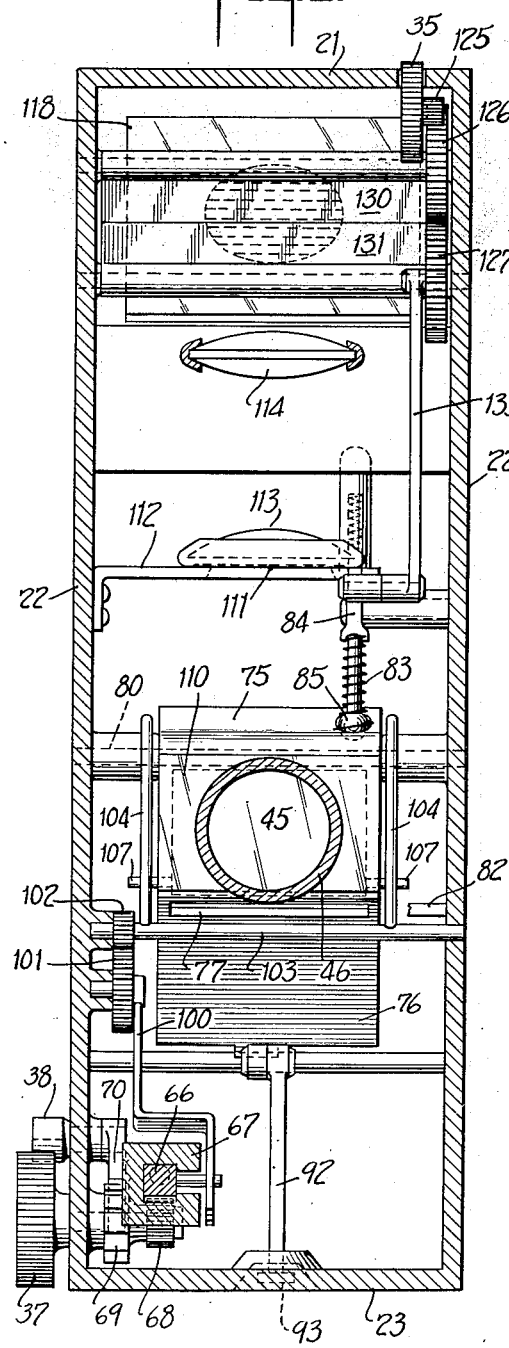
Fig. 6.
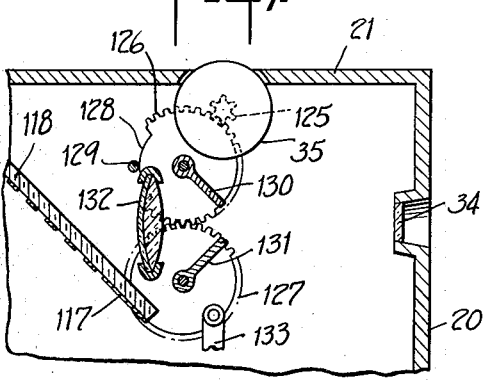
Fig. 7.
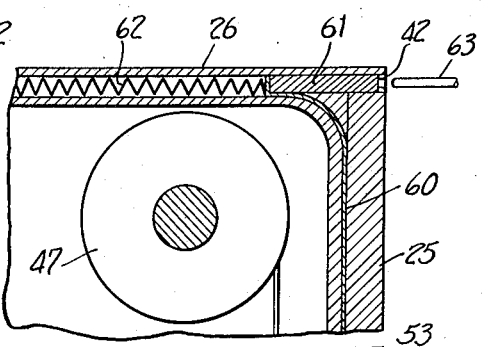
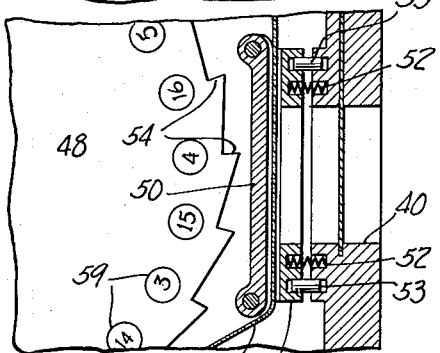
Fig. 8.
INVENTOR
*Alvin H. Cohen*
BY
*Gluck + Breitenfeld*
ATTORNEYS Sept. 23, 1941.  A. H. COHEN  2,256,517
CAMERA
Filed July 1, 1939  6 Sheets-Sheet 4
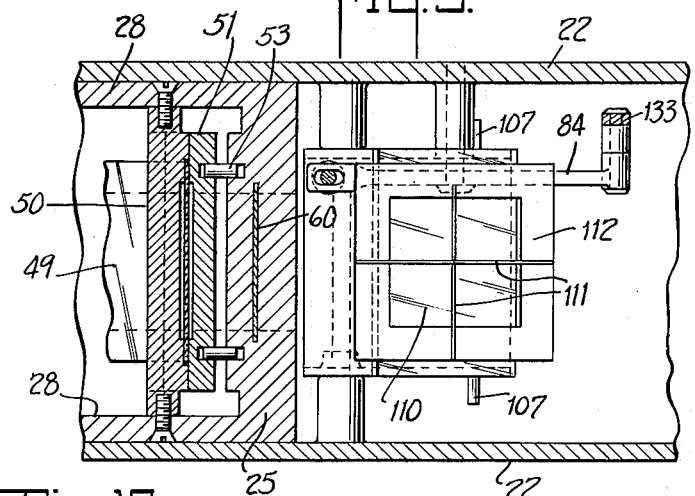
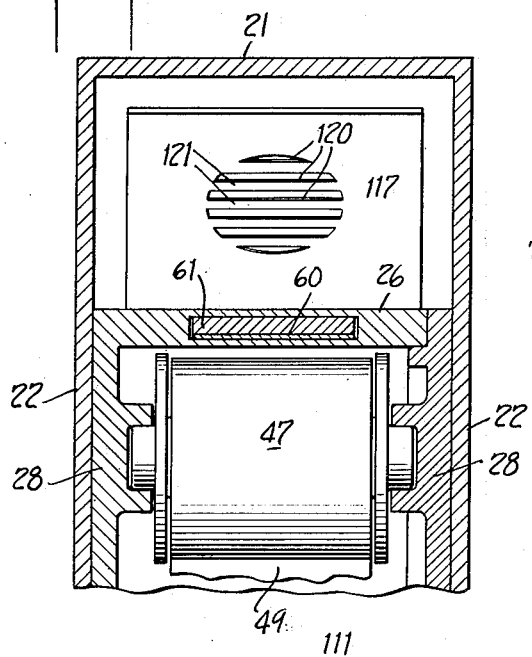
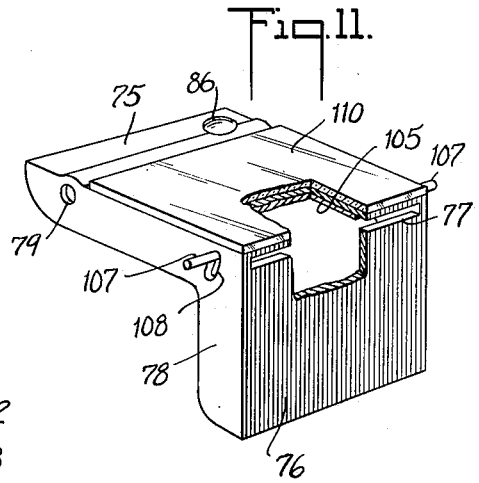
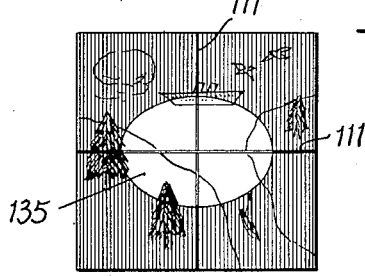
INVENTOR
*Alvin H. Cohen*
BY
*Gluck + Breitenfeld*
ATTORNEYS

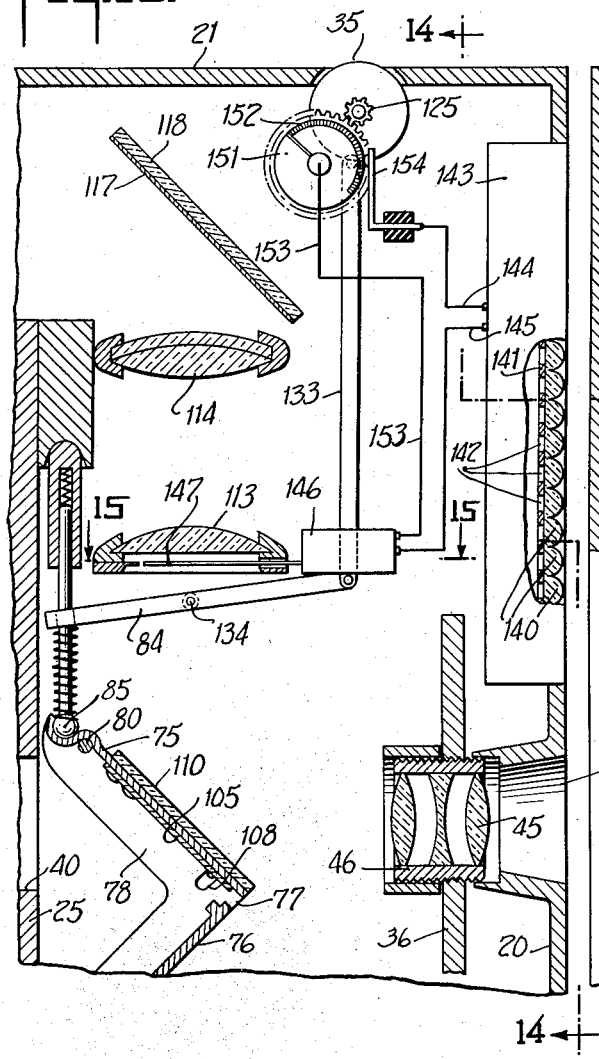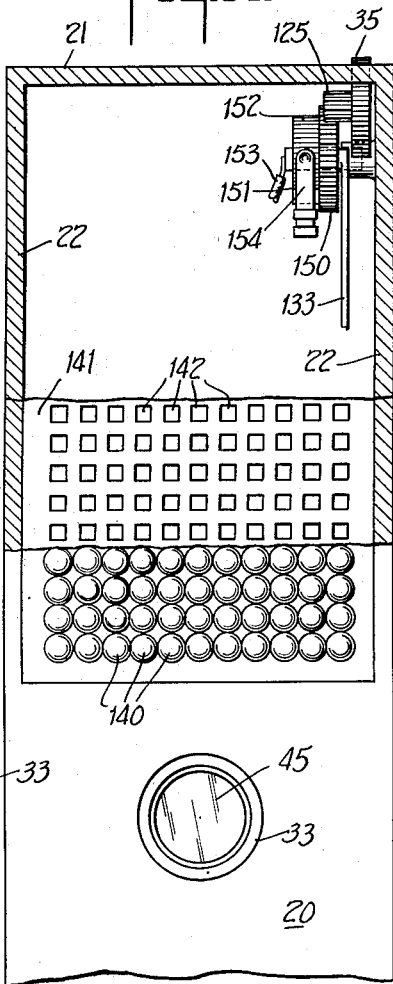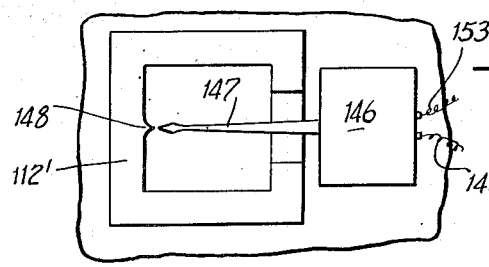

Sept. 23, 1941.  A. H. COHEN  2,256,517
CAMERA
Filed July 1, 1939  6 Sheets-Sheet 6

INVENTOR
Alvin H. Cohen
BY
Gluck + Breitenfeld
ATTORNEYS

Patented Sept. 23, 1941

2,256,517

UNITED STATES PATENT OFFICE 2,256,517

CAMERA

Alvin H. Cohen, New York, N. Y., assignor of one-half to Frederick L. Katz, New York, N. Y.

Application July 1, 1939, Serial No. 282,332

7 Claims. (Cl. 95—10)

My present invention relates generally to cameras, and has particular reference to a camera in which numerous structural and optical improvements simplify its construction and use, and improve the quality of the pictures that may be taken with it.

Existing cameras, even of the more expensive type, are subject to a large variety of disadvantages, some of which are well recognized, others of which are not commonly appreciated. Among these disadvantages—which present invention aims to overcome—are the following.

(A) There is no really accurate means for focusing the average portable camera. A focusing device of the range-finder type is unsatisfactory in cameras having large aperture lenses, because the focal length of such a lens varies when the aperture is reduced. Focusing devices which rely upon the merging of two superposed images are not easy to use by the inexperienced person. The focusing of a camera of the so-called "reflex" type, which relies upon the casting of an image on a ground glass surface, suffers from the disadvantage that a ground glass presents much too coarse a grain for really accurate focusing. Moreover, the focal length of a large-aperture lens changes when the aperture is reduced; so that focusing with the aperture open (otherwise the image on the ground glass might be too faint to be seen) gives no assurance of accurate focus when a picture is taken at a reduced aperture.

(B) Except in cameras of the so-called "reflex" type, accurate "framing" of the desired picture, especially where the subject is relatively close to the camera, is very difficult. A view-finder offset from the camera objective produces a condition of parallax which prevents accurate framing, and attempts to adjust for such parallax have generally proven to be impractical and relatively expensive.

(C) The multiplicity of adjustments that have to be independently made, prior to the taking of a picture with an ordinary camera, make it extremely difficult for the average person to utilize the camera to its maximum advantage under all conditions, and even the experienced photographer must interrupt the framing operation to make these adjustments. I refer particularly to the adjustment of the usual variable aperture, the adjustment of the shutter speed, and the adjustment of a distance scale where there is no range-finder or its equivalent.

(D) Every type of commercial camera, except those of the uncorrected lens type, has a variable aperture. It is seldom realized, however, that where a lens is made to be used at various apertures, the corrections for optical aberrations are a compromise which make the lens most efficient at only one specific aperture, and even at this aperture the lens does not have the maximum possible corrections, i. e., it is less efficient at that aperture than a lens designed for that specific aperture and none other. Accordingly, the lens never operates at maximum possible efficiency. Moreover, as hereinbefore stated, the variations in aperture of certain lenses change the focal length.

In accordance with my invention, these, and other disadvantages, are sought to be obviated; and, in addition, a number of new and desirable advantages are achieved. By means of my invention, there is a definite automatic correlation between the intensity and quality of the light that enters the camera, the actinic sensitivity of the film, and the effective shutter speed. Many of the new features of the present improved camera are of independent utility, as will be pointed out hereinafter; and where my improvements the conjointly used they result in imparting to the camera a simplicity, an ease and reliability of operation, and a uniform functioning at maximum efficiency, not heretofore attainable.

Among the characterizing features of my invention are the following.

(a) I employ a lens of fixed aperture and restricted field of view, and the lens is specifically corrected for the zonal aberrations corresponding to that aperture and for the field aberrations corresponding to that restricted field of view. As a result, no adjustments need ever be made so far as variations of aperture are concerned, and the lens always operates at maximum efficiency and maintains a fixed focal length.

(b) I provide for framing by means of an optical system for viewing, and preferably magnifying, an image produced by the lens itself; and the image is a so-called "aerial" image, thus dispensing with the use and inherent disadvantages of a ground glass surface or its equivalent.

(c) The image which the photographer views presents no problem of parallax, it is always clearly visible and well illuminated, and the operator need not remove the camera from his eye during the framing, focusing, adjusting for light intensity and quality, and taking of the picture.

(d) Variations in the intensity and quality of the light emanating from the subject are compensated for by varying the effective speed of the shutter, and the proper effective speed is automatically and accurately provided for by a simple adjustment which the photographer makes while he is viewing the image. More particularly, I provide a window independent of the lens for transmitting a beam of light from the subject, a device to receive this beam and to produce a visible effect upon the viewed image in proportion to the light received, and an adjuster for varying this visible effect, the adjuster automatically controlling the variations in the effective speed of the shutter.

(e) The window may advantageously be of a special character, whereby the beam which it transmits consists only of light to which the film of the camera is most sensitive. As a result, the effective shutter speed is automatically adjusted to a degree which is most efficient not only with respect to the intensity of the light, but also with respect to the sensitivity of the film, as distinguished from the sensitivity or peculiarities of the photographer's vision or judgment.

(f) I provide a shutter of special and novel type, having a slit adapted to sweep across the principal axis of the lens. The shutter has a part which enters into the optical make-up of the viewing system previously referred to.

(g) I provide a special arrangement whereby a film magazine is removably insertable, bodily, into the camera, it being intended that this magazine will be loaded and unloaded by the manufacturer or other professional service organization. This assures the use of the best and most proper kind of film, and its proper development and treatment after exposure. It also obviates the necessity for cumbersome loading and unloading manipulations by the photographer, and thus contributes to the ease of use of the camera.

(h) The magazine is so constructed that the film is always completely enclosed and guarded from stray light, and at no time is the film itself relied upon to cooperate with frictional or other guides to maintain the magazine light-tight. The present magazine has a port or opening, entirely independent of the film, through which the film is exposed when a picture is taken.

(i) The film magazine includes a take-up reel of special character; and the various other elements entering into the present construction are of such a character that the camera may be of unusually small size. More particularly, I aim to take pictures which may be as small as about one-quarter of an inch square, and the camera as a whole may be made less than one inch in width, less than four inches in length, and approximately two inches in height.

I achieve the foregoing objects and such other objects as may hereinafter appear or be pointed out, in the manner illustratively exemplified in the accompanying drawings, wherein—

Figure 1 is a perspective view of a camera body constructed in accordance with my present invention and showing the film magazine in separated relationship;

Figure 2 is a general cross-sectional elevation through the camera;

Figure 6 is an enlarged cross-sectional view taken substantially along the line 6—6 of Figure 2;

Figure 7 is an enlarged fragmentary cross-sectional view showing the upper right hand portion of Figure 2;

Figure 8 is a fragmentary enlarged cross-section showing certain details of the film magazine;

Figure 9 is an enlarged cross-sectional view taken substantially along the line 9—9 of Figure 2;

Figure 10 is an enlarged cross-sectional view taken substantially along the line 10—10 of Figure 2;

Figure 11 is a perspective view of the shutter, with portions broken away and shown in section;

Figure 12 is intended to depict the view which the operator sees when the camera is used;

Figure 13 is an enlarged cross-sectional view of the upper right hand portion of Figure 2, showing certain modifications;

Figure 14 is a cross-sectional view taken substantially along the line 14—14 of Figure 13;

Figure 15 is a fragmentary view taken substantially along the line 15—15 of Figure 13;

Figure 3:
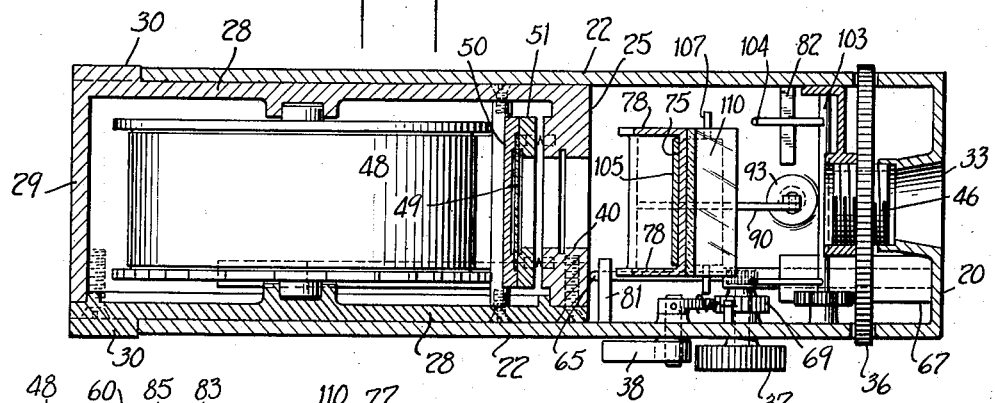
Figure 3 is a cross-sectional plan view taken substantially along the line 3—3 of Figure 2.
Figure 4:
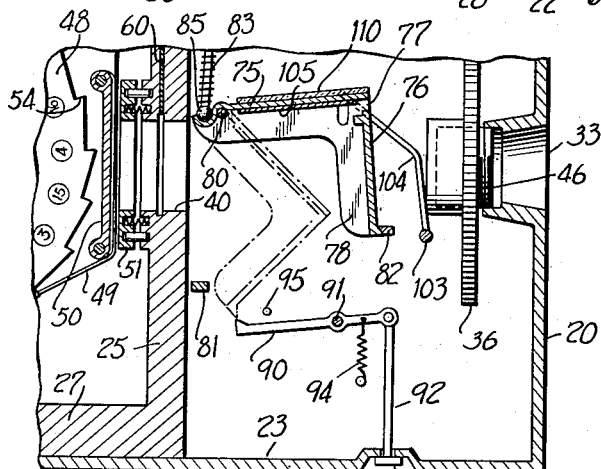
Figure 4 is a fragmentary view showing the lower right hand portion of Figure 2 with the shutter in its end position.

Referring for the moment to Figure 1, the camera body is preferably of substantially rectangular shape having the front wall 20, the top wall 21, the side walls 22, and a bottom wall 23. The rear wall 24 extends downward for only a short distance, thus leaving a rear rectangular opening for the reception of the film magazine. This magazine is similarly of rectangular shape having the front wall 25, the top wall 26, the bottom wall 27, side walls 28, and a rear wall 29, the latter serving to complete the rear wall of the entire camera when the magazine is in position.

The camera body may thus be said to have a compartment into which the film magazine is removably insertable. The handling of the magazine is preferably accomplished by finger grips 30 which fit into corresponding recesses 31 in the side walls 22 of the camera, and the magazine may be held in position in any convenient manner and I have illustratively shown an openable latch or fastening device 32.

In the front wall 20 of the camera there is an opening 33 behind which the objective lens is mounted. Near the top there is a window 34 intended to receive and transmit a beam of light from the subject which is to be photographed. Accessible through the top wall 21 is a control wheel 35, or its equivalent, for actuating the mechanism hereinafter referred to as the "adjuster."

In the side wall 22 which is visible in Figure 1, there is accessible a control wheel 36 which controls the movements of the objective lens for focusing purposes, also a wheel or equivalent device 37, and a release element 38, controlling the advancement of the film and the restoration of the shutter after an exposure has been made. I also provide a sight opening 39 through which the position of the film, at any instant, is observable.

In the front wall 25 of the film magazine I provide an opening 40, preferably square, through which may pass the image formed by the objective lens. In this front wall there is also an opening 41, preferably near the bottom, and an opening 42, preferably near the top, the former being shown substantially circular, the latter being shown in the form of a slit.

In the side wall 28, visible in Figure 1, there is a sight opening 43 adapted to align with the opening 39 when the magazine is in position.

Screws 44, or any other convenient fastening devices, serve to permit opening of the film magazine for loading and reloading purposes.

The functioning and purposes of these various control wheels and openings will become apparent in connection with the more detailed description of the several parts of the camera, which is to follow. It is to be understood that, in each case, unless otherwise specified, these details are given merely by way of example, and it will also be understood that the various elements entering into the present construction, including the various lenses, are all mounted and supported in any convenient manner by brackets and frames, and equivalent known structural elements, but may not be in each case specifically described.

The objective lens

This lens is referred to generally by the reference numeral 45. It is preferably mounted in a cylindrical sleeve 46 which is externally threaded and engaged by the control wheel 36, whereby rotation of the wheel 36 will advance and retract the lens 45 with respect to the opening 33.

As hereinbefore stated, the objective lens has a predetermined fixed aperture, and a predetermined restricted field of view. The lens is specifically corrected for the zonal aberrations (i. e., spherical aberration, sine condition, chromatic aberration, coma, etc.) corresponding to this aperture, and for the field aberrations (i. e., curvature of field, astigmatism, distortion, etc.) corresponding to this restricted field of view. As a result, the lens functions at maximum possible efficiency at all times, producing an extremely well-defined image with a minimum disc of confusion. So far as I am aware, no corrected lens of this character has ever before been used in a camera.

Preferably, the fixed aperture is about F6.3, and the restricted field of view is about 20°, but it will be understood that my invention is not restricted to these values.

The film magazine

It will be understood that the present camera is intended to be used with a film whose resolving power is comparable with that of the optical system. Such film is loaded into the magazine as shown most clearly in Figures 2, 5 and 8.

It will be observed that I have provided a relatively small feeding reel 47 and a relatively large take-up reel 48. The film 49 travels from one to the other, and in doing so it passes in front of a guide plate 50, against which it is pressed by a guide plate 51 which is constantly under the urgence of springs 52 and under the guidance of pins 53. The element 51 is provided with an opening which is in alignment with the opening 40.

The take-up reel 48 is provided with teeth 54, preferably on its periphery. Under normal conditions one of these teeth always engages the yieldable detent 55 which holds the reel 48 against movement. The advancement of the film is preferably effected by a spring finger 56 carried on a reciprocating member 57 which is adapted to move from the position of Figure 2 to the position of Figure 5. The forward end of the member 57 is normally held directly behind the opening 41 under the urgence of a compression spring 58.

The member 56 is of constant throw, and in the illustrated embodiment it advances by a distance equal to the combined lengths of two teeth 54, this distance being just sufficient to move the next adjacent unused portion of the film 49 into receptive position in alignment with the opening 40.

In accordance with my invention, the arc through which the reel 48 is thus advanced, in stepwise manner, is so selected that it is unevenly divisible into 360°. As a result, it is not until after the reel 48 has made at least two complete revolutions that the same tooth 54 is again engaged by the member 56. This is indicated by the sequence of markings 59 shown most clearly in Figures 2 and 5, these markings showing successively through the sight openings 43 and 39 as the reel 48 is advanced.

Provided in the top wall 26 of the film magazine, and extending down to the opening 40 in the front wall 25, is a guideway or slot within which a movable shield 60 is mounted. This shield may be of any suitable thin flexible opaque material. At its upper end it is secured in association with a block 61 and a compression spring 62, the block 61 being normally urged by the spring into a position directly behind the slit 42. Under these circumstances, the shield 80 extends across the opening 40 thus making the interior of the film magazine light-tight.

Accordingly, whenever the film magazine is withdrawn from the camera, the shield 60 closes the opening 40, as shown in Figure 1. As the magazine is inserted into the camera, a rigid element 63, mounted on the interior of the camera body, enters the slit 42 and pushes the block 61 rearwardly as the magazine is pressed forwardly into the camera, thus automatically raising the shield 60.

At no time does the film itself enter into the function of shielding those portions of it which are not in alignment with the principal axis of the camera lens. Accordingly, the film is subjected to no friction at all, at any time, except along its edges.

The film advancing means

Figure 5:
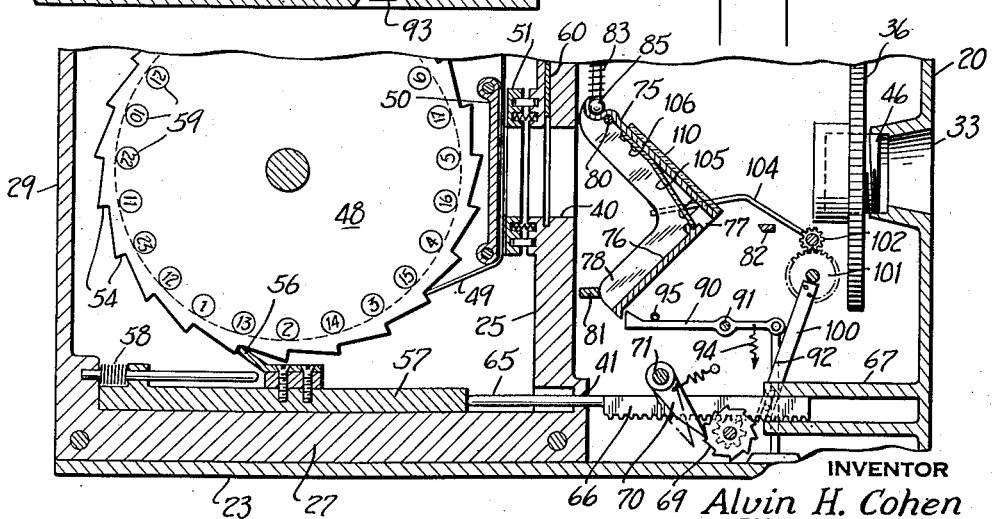
Figure 5 is a fragmentary cross-sectional view of the lower portion of Figure 2 showing the parts in an adjusted relationship.

The member 57 is moved from the normal position of Figure 2 to the position of Figure 5 by means of a rigid rod 65 carried at the rear end of a toothed rack 66 which is mounted for reciprocating movement in a suitable guide 67. Meshing with the teeth on the rack 66 is a pinion 68 coaxially mounted on the control wheel 37. Mounted in association with this pinion is a ratchet 69 normally engaged by the spring-pressed pawl 70, the latter being pivoted to a pin 71 on which the release member 38 is secured.

When the film is to be advanced, the wheel 37 is rotated in the direction of the arrow of Figure 1, and this rotation is continued until the member 57 reaches the position of Figure 5, at which time further rotation is impossible. The release 38 is then moved in the direction of the arrow of Figure 1, thus causing a release of the pawl 70 from the ratchet 69, and allowing the spring 58 to restore the parts to the position of Figure 2. During this restoration of the parts, the reel 48 is nevertheless held in the advanced position by means of the detent 55.

The shutter

The shutter and the parts associated with it are shown most clearly in Figures 2, 4, 5, 6 and 11. Briefly, the present improved shutter comprises a slitted member adapted to move from a starting position to one end position, during which movement the slit sweeps across the principal axis of the lens, the member being mounted for pivotal movement about an axis parallel to the slit.

In the preferred construction herein illustrated, I have shown the shutter consisting of the two angularly-related opaque wall portions 75 and 76 with the slit 77 arranged between their adjacent edges. Lateral webs 78 serve to rigidify the structure and to maintain the region beneath or behind the shutter in a light-shielded condition. The opening 79 shown in the web 78 near the free end of the wall portion 75 is aligned with a similar opening in the opposite web 78 (not visible in Figure 11), and these openings are adapted to be mounted upon a fixed pivot pin 80 extending between the opposite side walls of the camera. The shutter is adapted to pivot around the pin 80 between the starting position shown in full lines in Figures 2 and 5 and the end position shown in full lines in Figure 4. Movement in one direction is limited by the stop or abutment 81, and movement in the other direction may be conveniently limited by the stop or abutment 82.

The shutter operates under the action of a compression spring 83 which presses at the top against one end of the lever 84, and which presses at the opposite end against the ball 85, the latter being mounted in movable relation within a socket 86 closely adjacent to the free edge of the wall portion 75.

Under normal conditions, the shutter is held in the starting position by the free end of the lever 90 which rocks on the fixed pivot 91 and is articulated at its other end to the rod 92 extending down through the bottom wall 23 of the camera and terminating in a button 93. A spring 94, and a stop pin 95, hold the lever 90 in its normal position. When the shutter is to be actuated, the photographer presses upon the button 93, thereby releasing the shutter and allowing the spring 83 to swing the shutter into the full line position of Figure 4.

The restoration of the shutter to its starting position is accomplished at the same time that the film advancement takes place. Pivoted to the rack 66 is a link 100 adapted to move between the full line positions of Figure 2 and Figure 5. The upper end of this link is secured to a pinion 101 so that the movement of the link 100 serves to rotate the pinion 101 through an arc. This pinion meshes with a pinion 102 mounted on a shaft 103 which extends across the camera. Carried by and projecting from this shaft are the spaced arms 104 which are normally in the position shown in Figure 2, and which are adapted to move into the position of Figure 5 during the restoration of the shutter.

However, this restoration must necessarily take place without permitting further light to pass through the slit 77. With this object in view, a movable slit cover 105 is carried by the wall 75 on its underside. The member 105 is secured to the wall as at 106, and near the free end of the cover 105 it is provided with laterally extending projections 107 which extend through slightly curved slots 108 in the webs 78.

The member 105 is preferably of resilient metal or the like so that it normally lies flat against the underside of the wall 75, as shown in Figure 11. When the arms 104 start to move downwardly, they engage the projections 107. This results in first moving the projections 107 to the opposite ends of the slots 108, these slot ends serving as abutments. The slit cover 105 is thus moved into the position shown in Figure 5, covering the slit 77 and preventing the passage of light through it. Further movement of the arms 104 is effective upon the shutter through the intermediary of the projections 107, to restore the shutter ultimately to the starting position.

The optical viewing system

When an exposure is made, the objective lens 45 casts an image upon the film portion receptively positioned behind the opening 40. Before exposure, however, the rays of light entering through the objective lens are reflected, preferably at a right angle, by means of the reflector 110 secured on the external side of the wall 75 of the shutter. As a result, an image is formed in the plane indicated by the dot-and-dash line 9—9 in Figure 2. There is no surface of any kind to receive this image, which is therefore what is known as an aerial image. However, a means such as the crossed wires 111 are arranged in the plane of the image, these wires being preferably mounted in a frame 112 whose opening is identical in shape and size with the shape and size of the film portion ultimately to be exposed.

The means for viewing this aerial image, preferably on a magnified scale, consists of a sort of telescope. Any suitable lens arrangement may be employed, and I have illustratively shown lenses 113, 114, 115 and 116. It will be observed that the axis of the telescope turns through 90°, this being accomplished by the reflecting surface 117 provided on the oblique transparent supporting plate 118. The eye piece of the optical system is at an opening in the rear wall of the camera, near the top, and when the eye of the observer is positioned at this opening, he is enabled to view the aerial image, which appears somewhat as shown in Figure 12. The eye-piece has not been shown in detail, and may be of any well-known type, either adjustable or not.

By virtue of the present arrangement, the observer is seeing exactly what the lens of the camera "sees," and when the operator manipulates the control wheel 36 to shift the camera objective he is enabled to bring the image accurately into focus. He is at the same time enabled accurately to frame the picture he intends to take.

This procedure is similar to that which takes place with the ordinary "reflex" camera, but it is to be noted that the present image is at all times clearly visible under exactly the same aperture opening as that which will be used when the picture is taken. It will also be observed that the image, being an aerial image, is exceedingly well defined, is not disrupted or diffused by a ground glass surface or its equivalent, and is much more fully illuminated than the image cast on a ground glass.

It should be noted that, in transmitting a view of the image at the plane 9—9 of Figure 2, the optical system produces a second aerial image at the plane indicated by the dot-and-dash line 119.

Control of effective shutter speed

In the embodiment illustrated in Figures 1–12, the reflecting surface 117 is provided with openings 120, slightly spaced to permit the reflecting surface 117 to be continuous along spaced bands 121. The openings 120 conjointly define an opening of distinctive contour which I have illustratively shown substantially circular. This opening permits light to pass through the reflector 117 from the rear of the transparent plate 118, for a purpose presently to be described.

Referring now to Figures 6 and 7, it will be observed that the control wheel 35 is coaxially mounted with a pinion 125. This pinion meshes with a gear 126 which in turn meshes with a gear 127. A segment of the gear 126 is cut out, as at 128, and cooperates with a pin 129 to limit the movements of the gear 126 to a predetermined arc.

Mounted on the shaft of the gear 126 is an opaque gate 130, and mounted on the shaft of the gear 127 is a complementary opaque gate 131. Behind this gate device a collecting lens 132 is preferably mounted.

Pivotally secured to the gear 127 is the upper end of a link 133, the lower end of which is pivotally articulated to the end of the lever 84 opposite to the end which presses upon the spring 83, the lever 84 being mounted for rocking movement around the pivot 134.

The link 133, and the lever 84, are adapted to move as indicated most clearly in Figure 2.

The gate device is arranged directly behind the window 34, and this window is specially mounted and masked so that it has exactly the same restricted field of view as that which is imposed on the film.

Under normal conditions the gates 130 and 131 are in alignment as shown in Figure 2, and the beam of light which the window 34 transmits (from the subject upon which the camera objective is trained) is blocked by this gate. The photographer, with his eye to the optical system, frames the subject and brings its image into focus. He then manipulates the wheel 35 to open the gates 130 and 131. The beam passing through the window 34 is thus enabled to pass through the lens 132 and encounter the transparent plate 118. So far as this beam is concerned, the reflector 117 is an opaque member, but this member has an opening of distinctive contour, as hereinbefore described, by virtue of the provision of the slits 120. As a result, a spot of light of corresponding contour is superimposed upon the image which the photographer is viewing. (To be entirely accurate, the spot is superimposed upon the image at the plane 119.) This spot of light is intended to be indicated by the reference numeral 135 in Figure 12. It creates a visible effect upon the image which the photographer is viewing, and one of the most noticeable effects is to lighten the cross created by the wires 111.

In order for the operator to lighten this cross to a predetermined extent, he will have to open the gate more or less, depending upon the intensity of the illumination of the subject. If, for example, it is a dull day, or the subject is in the shade, he will have to open the gate by a greater amount in order to produce the same predetermined visible effect upon the image which he is viewing; whereas, if the subject is highly illuminated he will have to open the gate by a lesser amount.

In any event, the wheel 35, and the parts associated with it, serve as an adjuster for varying the visible effect upon the image, and this adjuster in turn automatically varies the effective speed of the shutter.

By way of example, let it be assumed that the subject is poorly illuminated, as a result of which the gates 130 and 131 are moved into the full line positions of Figure 7, or substantially into the dot-and-dash positions of Figure 2. Under these circumstances, the link 133 will have moved substantially into the dot-and-dash position of Figure 2, as a result of which the spring 83 will have been loosened to a corresponding degree, whereby the ultimate release of the shutter will cause the shutter to pivot from the starting position to the end position at a slower rate of speed. On the other hand, the more the gates are closed, the more the spring 83 will be tensioned, and the faster the shutter will be moved when it is released.

In accordance with my invention, I also prefer to impart to the window 34 such chromatic light-transmitting properties, that the beam which it transmits consists only of light to which the film of the camera is most sensitive. In this way, the effective speed of the shutter is automatically adjusted not only to the intensity of illumination of the subject, but also to the actinic quality or intensity of the light emanating from the subject. Furthermore, by this arrangement, the spot of light 135, superimposed upon the image which the photographer views, will be of a different color from the remainder of the image. Accordingly, it is a relatively simple matter for the photographer to adjust the gate until a predetermined effect has been produced.

*The photo-electric cell modification*

Referring now to Figures 13-15, the window 34 is replaced, in this modified arrangement, by a much larger multiple window consisting of a series of minute convexities or lenses 140 covering a substantial area of the front wall of the camera. Behind this window I prefer to arrange a mask 141 which consists of a group of openings 142, each one arranged directly behind one of the lenses 140. In accordance with my invention, each of the openings 142 has the same shape as that of the film portion which is to be exposed. Thus, where the camera is intended to take a square picture, as is illustratively shown in the present drawings, each of the openings 142 is square.

Moreover, each of the lenses 140, in conjunction with a properly selected depth of the mask 141, is so designed that the field of view of this composite window is exactly the same as the restricted field of view which is imposed upon the film. More particularly, the less the convexity of each lens 140, and the greater the thickness of the mask 141, the more restricted will be the field of view of this composite window.

Behind this window is a photo-electric cell 143 which I have not illustrated in detail, because such a cell is well known per se. Suffice it to point out that electrical lead wires 144 and 145 connect with a device 146, which is an electric meter, known per se, which controls the movements of a movable pointer 147, this pointer moving by varying amounts, in proportion to the intensity of the light acting on the photo-electric cell.

In accordance with my invention the pointer 147 is arranged in alignment with or closely adjacent to the plane at which the aerial image is produced. The frame 112 may be in this case provided advantageously with a fixed marker 148 having a predetermined positional relation to the pointer 147 when the effective shutter speed is adjusted to the proper amount.

The wheel 35 is in this case the same as in the previous embodiment, and it is coaxially mounted with the same pinion 125. In this case, however, the pinion meshes with a gear 150 which is coaxially mounted with a wheel 151 on which there is a resistance winding 152. One end of this winding connects as at 153 with the device 146. The lead 144 terminates in a contact member 154 which wipes over the resistance winding 152.

When the operator uses this camera, after focusing the lens and framing the picture, he adjusts the wheel 35 until the pointer 147 is brought to the predetermined proper positional relation to the fixed marker 148. Depending upon the intensity of the light from the subject the pointer 147 will deflect by a corresponding amount, and the wheel 35 will have to be adjusted in one or the other direction to bring the pointer 147 to the proper position. As in the previously described construction, the movements of the wheel 35 automatically bring about corresponding movements in the link 133 and lever 84, thus adjusting the effective shutter speed automatically to the proper amount, in proportion to the intensity of the light emanating from the subject.

As in the case of the window 34 hereinbefore described, it is intended that the material of which the lenses 140 are made shall have such chromatic light-transmitting properties that the beam transmitted by these lenses consists only of light to which the film of the camera is most sensitive.

Those parts of the camera construction which, in Figures 13–15, are the same as those previously described, are designated by the same reference numerals, for the sake of simplicity of description and understanding. The reflecting surface 117 is, in this embodiment, completely intact and unbroken.

Figure 16:
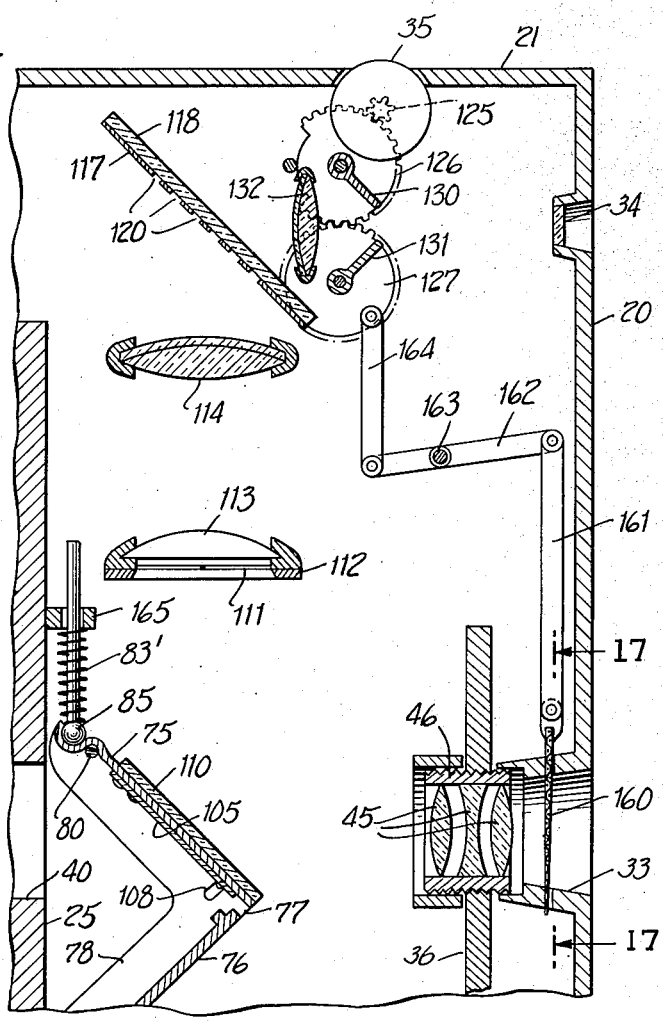
Figure 16 is a view similar to the upper right hand portion of Figure 2 showing a further modification.
Figure 17:
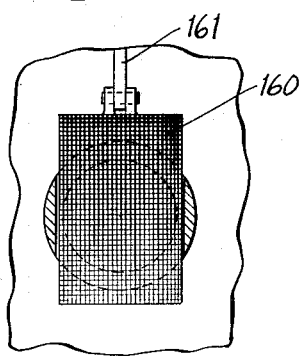
Figure 17 is a fragmentary view taken substantially along the line 17—17 of Figure 16.

*The modification of Figures 16–17*

I have heretofore described and illustrated the manner in which the effective shutter speed may be varied by varying the tension of the spring which actuates the shutter. Such a construction is preferred, because it is well known that best results—from the standpoint of resolution—are attained with a minimum exposure time and a maximum intensity of light. For example, a lens of F6.3 exposed for one-fortieth of a second will not take as good a picture as the same lens at F4.5 with an exposure time of one-eightieth of a second. Since the present lens has a fixed aperture, the exposure time is always at a minimum for any given picture-taking conditions.

However, the variation of the effective shutter speed may be accomplished in other ways, and I have illustratively shown in Figures 16–17 how this can be accomplished by means of a shiftable filter 160 associated with the objective lens. The filter 160 is of the character known as a "neutral density filter," which has adjacent regions of gradually-varying light-transmitting qualities, but which does not vary the chromatic quality of the light. In the drawings, I have attempted to show this by making the filter 160 of exaggerated thickness at its upper end and exaggerated thinness at its lower end but it will be understood that this showing is not mechanically accurate and that it is intended merely to indicate that the filter has a greater density at its upper end than at its lower end, the light-transmitting qualities varying gradually in between.

I have mounted the filter 160 in front of the objective lens, and I have illustratively suspended it from a link 161. The upper end of this link is pivoted to one end of a lever 162 which rocks about the fixed pivot 163 and has its opposite end articulated to the link 164. This link corresponds to the link 133 previously described, and is attached to the gear 127.

The window 34, and the other parts associated with this portion of the camera, are the same as those which are illustrated in Figure 7 and described in connection with that and associated figures.

Where the light from the subject is relatively intense or bright, or otherwise photographically potent, the gear 126 will be rotated by a very slight amount. As a result, the filter 160 will be in a relatively depressed position, with more of the denser part in front of the lens. This speeds up the effective shutter speed, i. e., it permits less light to affect the film. Similarly, where the light from the subject is dull, the gear 127 will be moved to a greater extent, thereby lifting the filter 160 to a relatively elevated position in which more light is allowed to enter the objective lens, whereby the effective shutter speed is decreased, i. e., more light is permitted to affect the film.

The actual shutter speed, in this embodiment, is always the same, being under the control of a spring 83' whose upper end bears against the fixed abutment 165, instead of against the variable abutment constituted of the lever 84.

Obviously, the photo-electric cell modification might be tied up with the movable filter arrangement, if desired.

In general, it will be understood that changes in the details herein described and illustrated for the purpose of explaining the nature of my invention may be made by those skilled in the art without departing from the spirit and scope of the invention as expressed in the appended claims. It is, therefore, intended that these details be interpreted as illustrative, and not in a limiting sense.

Having thus described my invention and illustrated its use, what I claim as new and desire to secure by Letters Patent is—

1. In a camera, an objective lens, means for supporting a sensitized film in a plane behind said objective lens, a shutter positioned between the objective lens and said film, an optical system for viewing an aerial image, formed by the objective lens, of the subject to be photographed, said optical system comprising a reflector movable into and out of a position where it intercepts the light rays passing through said objective and directs them toward a focusing plane other than that in which the sensitized film is disposed, a photo-electric cell, a window independent of the objective lens adapted to transmit to said photo-electric cell a beam of light emanating substantially from the subject to be photographed, a pointer mounted for movement in said focusing plane, an electric circuit controlled by the photo-electric cell and controlling the movements of said pointer, an adjuster for affecting said circuit to vary the position of said pointer, and means operable by said adjusted for varying the effective speed of said shutter.

2. In a camera, the combination with the elements set forth in claim 1, of means controlled by the actuation of said shutter for moving said reflector out of said light-intercepting position when the shutter is actuated to expose said film.

3. In a camera, an objective lens, means for supporting a sensitized film in a plane behind said objective lens, a shutter positioned between the objective lens and said film, said shutter comprising a pivoted member adapted to move from a starting position to an end position during which movement the film becomes exposed, an optical system for viewing an aerial image, formed by the objective lens, of the subject to be photographed, said optical system comprising a reflector movable into and out of a position where it intercepts the light rays passing through said objective lens and directs them toward a focusing plane other than that in which the sensitized film is disposed, said reflector being carried by said shutter whereby it is automatically moved out of said light-intercepting position when the shutter is actuated to expose said film, a photoelectric cell, a window independent of the objective lens adapted to transmit to said photo-electric cell a beam of light emanating substantially from the subject to be photographed, a pointer mounted for movement in said focusing plane, an electric circuit controlled by the photo-electric cell and controlling the movements of said pointer, an adjuster for affecting said circuit to vary the position of said pointer, and means operable by said adjuster for varying the effective speed of said shutter.

4. In a camera, the combination of elements set forth in claim 1, said shutter comprising a pivoted slitted member adapted to pivot from a starting position to an end position during which pivotal movement the slit sweeps across the principal axis of the camera thereby exposing said film, said reflector being carried by said shutter alongside of said slit so that it is in said light-intercepting position when the shutter is in its starting position and whereby the reflector is automatically moved out of said light-intercepting position when the shutter is actuated to expose said film.

5. In a camera, an objective lens, means for supporting a sensitized film in a plane behind said objective lens, a shutter positioned between the objective lens and said film, said shutter comprising a member adapted to move from a starting position to an end position during which movement the film is exposed, a spring for moving the shutter from the starting position to the end position, an optical system for viewing an aerial image, formed by the objective lens, of the subject to be photographed, said optical system comprising a reflector movable into and out of a position where it intercepts the light rays passing through said objective lens and directs them toward a focusing plane other than that in which the sensitized film is disposed, a photo-electric cell, a window independent of the objective lens adapted to transmit to said photo-electric cell a beam of light emanating substantially from the subject to be photographed, a pointer mounted for movement in said focusing plane, an electric circuit controlled by the photo-electric cell and controlling the movements of said pointer, an adjuster for affecting said circuit to vary the position of said pointer, and means operable by said adjuster for varying the tension of said spring thereby varying the effective speed of said shutter.

6. In a camera, the combination of elements set forth in claim 1, said adjuster comprising a variable electrical resistance in said electric circuit, and a control wheel accessible from the exterior of the camera and adapted, by movements thereof, to effect variations of said resistance.

7. In a camera, an objective lens, means for supporting a sensitized film in a plane behind said objective lens, a shutter positioned between the objective lens and said film, said shutter comprising a member adapted to move from a starting position to an end position during which movement the film is exposed, a spring for moving the shutter from the starting position to the end position, an optical system for viewing an aerial image, formed by the objective lens, of the subject to be photographed, said optical system comprising a reflector movable into and out of a position where it intercepts the light rays passing through said objective lens and directs them toward a focusing plane other than that in which the sensitized film is disposed, a photo-electric cell, a window independent of the objective lens adapted to transmit to said photo-electric cell a beam of light emanating substantially from the subject to be photographed, a pointer mounted for movement in said focusing plane, an electric circuit controlled by the photo-electric cell and controlling the movements of said pointer, a variable resistance in said circuit, an adjuster for affecting said circuit to vary the position of said pointer, said adjuster comprising a control wheel accessible from the exterior of the camera and adapted, by movements thereof, to effect variations of said resistance, and means operable by said movements of said control wheel for varying the tension of said spring thereby varying the effective speed of said shutter.

ALVIN H. COHEN.

CERTIFICATE OF CORRECTION.

Patent No. 2,256,517.　　　　　　　　　　　September 23, 1941.

ALVIN H. COHEN.

It is hereby certified that error appears in the printed specification of the above numbered patent requiring correction as follows: Page 1, first column, line 11, after the word "which" insert --my--; and second column, line 23, for "the" read --are--; page 3, second column, line 32, for "shield 80" read --shield 60--; page 4, first column, line 6, for "one end" read --an end--; page 6, second column, line 70, for the word "adjusted" read --adjuster--; and that the said Letters Patent should be read with this correction therein that the same may conform to the record of the case in the Patent Office.

Signed and sealed this 25th day of November, A. D. 1941.

(Seal)　　　　　　　　　　　　　　　　　Henry Van Arsdale,
　　　　　　　　　　　　　　　　　　　Acting Commissioner of Patents.